Jan. 20, 1970  L. W. HENSHAW  3,490,775
STUFFING BOX PACKING ASSEMBLY
Filed Dec. 15, 1967
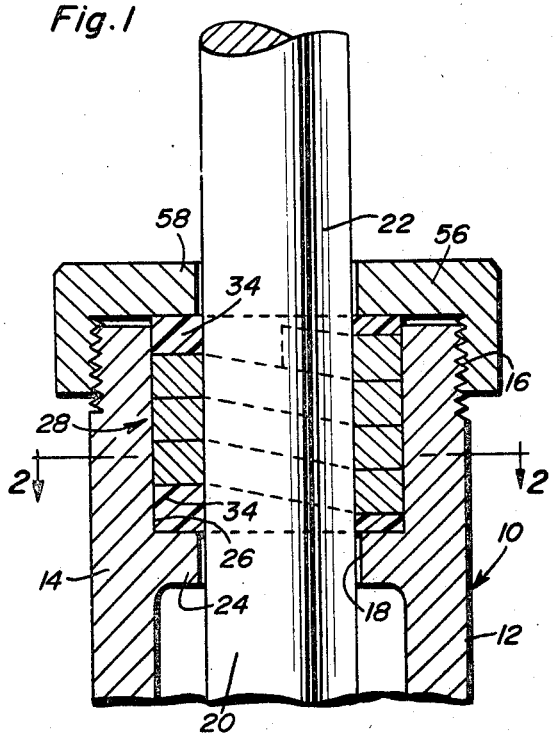
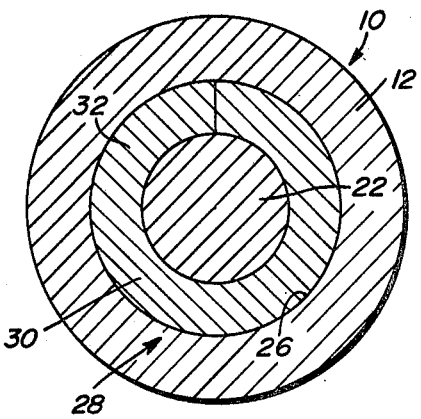
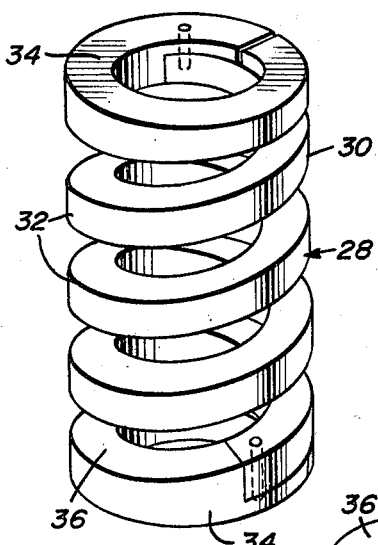
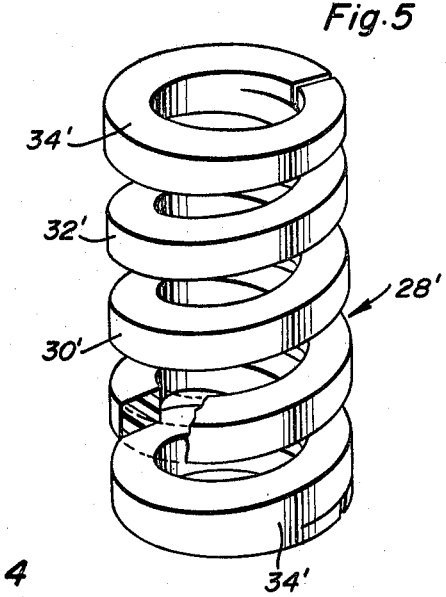
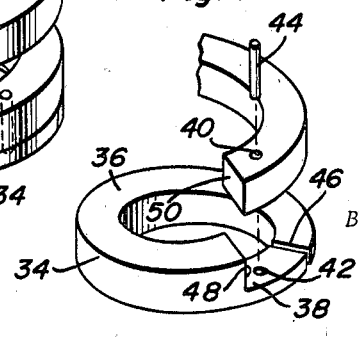
Langford W. Henshaw
INVENTOR.

United States Patent Office 3,490,775
Patented Jan. 20, 1970

3,490,775
STUFFING BOX PACKING ASSEMBLY
Langford W. Henshaw, Box 1227,
Blackwell, Tex. 79506
Continuation-in-part of application Ser. No. 549,255,
May 11, 1966. This application Dec. 15, 1967, Ser.
No. 690,847
Int. Cl. F16j *15/20, 15/28*
U.S. Cl. 277—110   5 Claims

ABSTRACT OF THE DISCLOSURE

A convoluted packing member constructed of slightly deformable material and including opposite end radially split sleeve members, the inner and outer surfaces of the convoluted and sleeve members being such that when the convolutions of the convoluted member are disposed in intimate contact with each other a cylindrical packing assembly will be formed including contiguous inner and outer cylindrical surfaces.

---

This application comprises a continuation-in-part of my copending application Ser. No. 549,255, filed May 11, 1966, now U.S. Patent No. 3,442,518.

The packing assembly of this invention is designed for use in many environments including stuffing boxes provided with generally parallel opposite end walls relatively movable toward and away from each other. The packing assembly includes structural features by which a cylindrical packing member may be formed including contiguous inner and outer cylindrical surface portions and which may be axially compressed so as to expanded both radially inwardly and radially outwardly. Further, the packing assembly of the instant invention has also been constructed in a manner whereby it may be disposed about a shaft portion extending through a stuffing box without passing the packing assembly over an end portion of the shaft.

The main object of this invention is to provide a packing assembly capable of defining a substantially cylindrical shaped packing member including contiguous inner and outer cylindrical surface portions and which may be readily disposed about a shaft portion without passing the packing assembly over an end portion of the shaft portion.

Another object of this invention, in accordance with the immediately preceding object, is to provide a packing assembly which does not include continuous or stepped radial cuts extending throughout the length of the packing assembly.

Still another object of this invention is to provide a packing assembly that has high resistance to wear, is particularly well adaptable for sealing slightly misaligned shafts and which is also adapted to readily compensate for slight variances in the diameter of the shaft or shaft portion with which it is operatively associated.

Still another object of this invention is to provide an improved packing assembly utilizing a convoluted packing member in combination with opposing radially split sleeve members whose opposing faces are stepped and conform to the shape of the terminal ends of the convoluted packing member.

A final object of this invention to be specifically enumerated herein is to provide a packing assembly which will conform to conventional forms of manufacture, be of simple construction and easy to install so as to provide a device that will be economically feasible, long lasting and relatively trouble-free in installation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a longitudinal sectional view taken substantially upon a plane passing through the center of the packing assembly of the instant invention with the latter illustrated operatively associated with the stuffing box through which a shaft projects;

FIGURE 2 is a transverse sectional view taken substantially upon a plane indicated by the section line 2—2 of FIGURE 1;

FIGURE 3 is a perspective view of the packing assembly with the convolutions of the convoluted member being axially expanded relative to each other;

FIGURE 4 is a fragmentary exploded perspective view illustrating the manner in which one end of the convoluted member may be secured to the associated split sleeve member; and FIGURE 5 is a perspective view of a modified form of packing assembly in which the split sleeve members are formed integrally with the convoluted member.

Referring now more specifically to the drawings, the numeral 10 generally designates a stuffing box including a body 12 defining a generally cylindrical neck portion 14 whose free end is externally threaded as at 16. The neck portion 14 has a bore 18 formed therethrough in which a shaft 20 is disposed. The shaft 20 includes a smooth outer surface 22 and may be either mounted for rotation about its longitudinal axis relative to the body 12 or for longitudinal reciprocation relative to the body 12.

The bore 18 is formed through a partition 24 adjacent the outer end of the neck portion 14 and a counterbore 26 is defined in the neck portion 14 outwardly of the partition 24 in which the bore 18 is formed.

The packing assembly of the instant invention is generally referred to by the reference numeral 28 and defines a convoluted structure including a convoluted packing member 30 which may be constructed of any suitable material such as "Teflon," lead or impregnated woven material. The convoluted packing member 30 includes a plurality of convolutions 32 and each convolution 32 thereof is preferably generally rectangular in cross-sectional shape so that its inner and outer surface portions may readily conform to the cylindrical surfaces of the shaft 22 and the cylindrical inner surfaces of the neck portion 14 defined by the counterbore 26, although different cross-sectional shapes may be used.

The packing assembly or convoluted structure 28 further includes a pair of opposite end radially split sleeve members 34 and the sleeve members 34 include convoluted ramp surfaces 36 each extending through one convolution and which terminate at their remote ends in notches 38 complementary to and in which the corresponding terminal end of the convoluted packing member 30 is seatingly received.

From FIGURES 3 and 4 of the drawings it may be seen that the terminal ends of the convoluted packing member 30 include side surface portions which are contiguous with corresponding side surfaces on the adjacent portions of the sleeve members 34 and that the adjacent ends of the ramp surfaces 36 are also contiguous with the corresponding surface portions at the terminal ends of the convoluted packing member 30. Further, the opposite ends of the convoluted packing member 30 are apertured as at 40 and the split sleeve members 34 are apertured as at 42. Of course, the apertures 40 and 42 are registrable with each other and any suitable locating pin 44, or any other suitable means other than the apertures 40 and 42 and pins 44, may be utilized to secure the opposite end sleeve members 34 to the corresponding terminal ends of the convoluted packing member 30. Still further, each of the sleeve members 34 includes a radial cut 46 circumferentially spaced from the closed end of the notch 38.

When the packing assembly 28 is axially compressed the convolutions 32 are disposed in intimate contacting relation and the remote surfaces of the sleeve members 34 are generally parallel and the packing assembly defines a cylindrical packing structure including contiguous inner and outer cylindrical surface portions. Further, the cylindrical packing structure defined by the packing assembly 28 includes only the two radial cuts 46 and which therefore, when the convolutions 32 are tightly compressed in engagement with each other, defines a packing assembly which is substantially leakproof. Further, even when the ends of the convoluted packing member 30 are pinned to the sleeve members 34, the packing assembly 28 may be disposed about a shaft portion intermediate its opposite ends without passing the packing assembly 28 over either end of the shaft portion.

With attention now invited more specifically to FIGURE 5 of the drawings there may be seen a modified form of packing assembly referred to in general by the reference numeral 28' and which is very similar to the packing assembly 28 and has its various components designated by prime numerals corresponding to the numerals designating the similar components of the packing assembly 28. The packing assembly 28' is identical to the packing assembly 28 except that the cylindrical packing member 30' and the sleeve members 34' are integrally formed. The end faces 48 of the sleeve members 34 and the end faces 50 of the convoluted packing member 30 are joined so as to form the packing assembly 28' from one single piece of packing material. Of course, inasmuch as the convoluted packing member 30' is formed integrally with the sleeve members 34', the apertures 40 and 42 and the locating pins 44 are not needed. However, the packing assembly 28' may still be readily mounted for use on or removed from operative association with a shaft at a point on the latter intermediate its opposite ends.

In operation, the packing assemblies 28 and 28' may each be readily disposed about the shaft 22 by spreading the portions of the sleeve members 34 or 34' defining the radial slots therein apart and inserting the sleeve members 34 or 34' about the shaft 22. Of course, the convoluted members 30 and 30' may be readily "threaded" onto the shaft 22. The packing assembly 28 or the packing assembly 28' may then be axially inserted into the counterbore 26 and the internally threaded end cap 56 disposed on the shaft 52 may then be advanced toward the neck portion 14 and threadedly engaged therewith so as to axially compress the packing assembly between the inner surface of the end wall 58 of the end cap and the opposing surfaces of the partition 24.

Inasmuch as the convoluted members 30 and 30' include right hand convolutions, threaded engagement of the end cap 56 with the neck portion by means of right hand threads will cause the sleeve member 34 or 34' adjacent the end cap 56 to be urged in a clockwise direction thus tending to seat the terminal ends of the convoluted members in their respective seats and to longitudinally compress the convolutions while the end cap 56 is also axially compressing the packing assembly 28 and thus both inwardly and outwardly radially expanding the convoluted and sleeve members thereof. In this manner, an extremely tight packing forming a fluid-tight seal between the shaft 22 and the neck portion 14 is provided. Of course, the convoluted members 30 and 30' may include left hand convolutions provided the sleeve members 34 and 34' are shaped accordingly. In such instance it is then desirable that the end cap 56 and neck portion include left hand threads.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with body means defining a generally cylindrical bore extending therethrough and a shaft extending concentrically through said bore, said body including opposite end wall means defining opposing end walls for said bore and receiving axially spaced portions of said shaft therethrough, a packing assembly, said assembly defining an elongated convoluted structure including a center convoluted member and opposite end split sleeve members disposed at the opposite ends of said convoluted member, said convoluted and sleeve members being disposed about said shaft within said bore, said convoluted structure including opposite terminal ends and said opposite end members each defining a circumferentially and axially opening notch conforming to and in which the corresponding terminal end of said convoluted structure is seatingly received, said notches each being in part defined by the adjacent end of a convoluted ramp surface conforming to the opposing surface of the corresponding convolution, said end members including remote oppositely facing end faces said convoluted and end members including contiguous inner and outer cylindrical surface portions disposed in seated engagement with said shaft and the portion of said body means defining said bore, respectively, and being maintained under axial compression between said opposing end walls, whereby they are radially expanded into tight frictional engagement with the external surfaces of said shaft and the opposing surfaces of said bore, one of said wall means being supported from said body means for threaded advancement toward the other end wall means in response to rotation of said one end wall means relative to said body means in a direction in which said convoluted member is wound.

2. The combination of claim 1 wherein said end members comprise integral continuations of the corresponding end portions of said convoluted member and said terminal ends are defined by portions of said end members.

3. The combination of claim 1 wherein said end members comprise integral continuations of the corresponding radial cut spaced from the end of said notch in which the corresponding terminal end face of said convoluted member is seated.

4. The combination of claim 3 wherein said terminal ends are secured to said end members in said notches.

5. The combination of claim 1 wherein said center convoluted member includes more than one complete convolution.

References Cited

UNITED STATES PATENTS

| 990,841 | 5/1911 | Collins | 277—104 |
|---|---|---|---|
| 1,965,417 | 7/1934 | Kurth | 277—203 X |
| 2,657,414 | 11/1953 | Miller et al. | 15—210 |
| 2,866,217 | 12/1958 | Dean | 277—203 X |

SAMUEL ROTHBERG, Primary Examiner

U.S. Cl. X.R.

15—210; 277—203